(12) United States Patent
Satchwell (10) Patent No.: US 7,853,506 B2
(45) Date of Patent: *Dec. 14, 2010

(54) METHOD FOR CATEGORIZING PIVOT POINTS IN TECHNICAL ANALYSIS

(75) Inventor: Christopher J. Satchwell, Southampton (GB)

(73) Assignee: Recognia Incorporated, Ottawa (CA)

( * ) Notice: Subject to any disclaimer, the term of this patent is extended or adjusted under 35 U.S.C. 154(b) by 1604 days.

This patent is subject to a terminal disclaimer.

(21) Appl. No.: 10/245,240

(22) Filed: Sep. 17, 2002

(65) Prior Publication Data

US 2003/0065606 A1 Apr. 3, 2003

Related U.S. Application Data

(60) Provisional application No. 60/322,642, filed on Sep. 17, 2001.

(51) Int. Cl.
*G06Q 40/00* (2006.01)

(52) U.S. Cl. .................. 705/36 R; 705/35; 705/37; 705/1

(58) Field of Classification Search ............ 705/35–40
See application file for complete search history.

(56) References Cited

U.S. PATENT DOCUMENTS

| | | | | |
|---|---|---|---|---|
| 5,444,819 A | * | 8/1995 | Negishi | ............ 706/21 |
| 6,317,728 B1 | * | 11/2001 | Kane | ............ 705/36 R |
| 6,801,201 B2 | * | 10/2004 | Escher | ............ 705/36 R |
| 6,907,404 B1 | * | 6/2005 | Li | ............ 705/36 R |
| 7,469,238 B2 | * | 12/2008 | Satchwell | ............ 706/45 |
| 2003/0131315 A1 | * | 7/2003 | Escher | ............ 715/512 |

FOREIGN PATENT DOCUMENTS

| CA | 2 403 699 | * | 9/2002 |
|---|---|---|---|
| GB | 2253081 A | * | 8/1992 |

OTHER PUBLICATIONS

Townshend: "Point out potential & figure the risk", Futures, Chicago, Oct. 2000, vol. 29, Iss.13, p. 38, 3 pages.*

(Continued)

*Primary Examiner*—Narayanswamy Subramanian
*Assistant Examiner*—Ed Baird
(74) *Attorney, Agent, or Firm*—Osha • Liang LLP (57) ABSTRACT

A method and product for identifying and categorizing pivot points in a time series, such as a time series of financial data (e.g. stock prices) or medical data (e.g. ECG, EEG). The method permits categorization of pivot points in a time series according to their spatial importance and temporal occurrence. The time series has a predetermined end point, predetermined maximum and minimum box sizes, and a predetermined box size increment. The method consists of determining a breakout direction for the time series. Then, for each incremental box size from the maximum to the minimum, pivot points are identified. Commencing at the end point and working backwards through the time series, any point where a reversal of more than the current box size occurs is identified. For each such identified point, the previous extreme, its associated lag from the end point, and the box size at which it is first identified is then recorded.

12 Claims, 3 Drawing Sheets

OTHER PUBLICATIONS

Heeseok: "Justifying Database Normalization: A Cost/Benefit Model,", Department of Information Systems and Quantitative Analysis, College of Business Administration, University of Nebraska, Omaha, NE, accepted Mar. 24, 1994.*
Cryer et al: "Mirror-Image and Invariant Distributions in ARMA Models", Econometric Theory, vol. 5, No. 1 Apr. 1989, pp. 36-52.*
McClave, et al: "A First Course in Business Statistics, Fifth Edition", 1992, Macmillan publishing Company.*
Downes et al: "Dictionary of Financial and Investment Terms, Fifthe Edition", 1998, Barron's Education Series, Inc.*
Stockcharts.com: http://web .archive.org/web/20010201200800/http://stockcharts.com/education/How/AnalysisTools/pnfCharts.html, Feb. 1, 2001.*
Townshend: "Point out potential & figure the risk", Futures. Chicago: Oct. 2000. vol. 29, Iss. 13; p. 38, 3 pgs.*
Schwager : "Getting Started in Technical Analysis", ISBN-13: 9780471295426, Wiley, John & Sons, Incorporated Pub. Date: Feb. 1999.*

* cited by examiner

METHOD FOR CATEGORIZING PIVOT POINTS IN TECHNICAL ANALYSIS

This application claims priority from U.S. Provisional Application No. 60/322,642, filed Sep. 17, 2001.

FIELD OF THE INVENTION

The present invention relates generally to technical analysis, such as technical analysis for financial forecasting. More particularly, the present invention relates to a method and system for categorizing pivot points in technical analysis.

BACKGROUND OF THE INVENTION

Technical analysis, as opposed to fundamental analysis, uses the past price, volume activity, or other measures of a stock, or of a market as a whole, to predict the future direction of the stock or market. The results of a technical analysis are usually summarized in charts or graphs that are studied by technicians to identify known trends and patterns in the data to forecast future performance. A recent innovation in technical analysis is the use of neural networks to recognize patterns in financial data. However, training neural networks to recognize patterns, or formations, in financial results is cumbersome and highly dependent on the quality of data used to train the neural network.

Graphs of time series, particularly financial time series, sometimes exhibit specific formations prior to moving in a particular direction. Some relevant formations have been described by a number of authors, including Edwards, R. D. and Magee, J. "Technical Analysis of Stock Trends" ISBN 0-8144-0373-5, St. Lucie Press 1998 and Murphy, J. J. "Technical Analysis of the Futures Markets" ISBN 0-13-898008-X, New York Institute of Finance 1986. To anticipate the likely behaviour of some time series, it is advantageous to be able to recognise predictive formations as soon as they occur. Many predictive formations share a common characteristic of being capable of representation by a stylised zig-zag line. Explanations given in Murphy, supra, are largely framed around this concept. It follows that if a method can be found to find suitable zig-zag lines, then the recognition of many predictive formations is greatly simplified. To construct zig-zag lines of a type required to recognise formations, it is particularly useful to categorise time series turning, or pivot, points, as different regions of a formation often require turning points of different strengths. Categorization facilitates the application of appropriate recognition filters to determine the relevance of turning points at various locations in a potential formation.

One well-known technique in technical analysis is point and figure charting. In point and figure charting, the price of, for example, a stock is plotted as columns of rising Xs and falling Os to denote price movement greater than, or equal to, a threshold amount, denoted a box size. Unlike other charting methods, such as open, high, low, close (OHLC), bar or candlestick, where price action is plotted according to time, point and figure charting is essentially time independent and price, not time, dictates how point and figure charts take shape. For example, a series of volatile trading sessions over the course of a week could fill an entire page or screen in a point and figure chart, whereas a month of inactivity or static range trading might not be reflected on the chart, depending on the chosen box size. The box size determines how much background "noise" is removed from the price action, and, hence, the granularity of the resulting chart. The factors that typically influence the choice of box size include volatility and the time horizon being examined.

The technique of conventional point and figure charting is described in detail in Kaufman, P. J. "Trading Systems and Methods" ISBN 0-413-14879-2, John Wiley & Sons 1996. In summary, a box size, datum price and datum time, are chosen. If a new high exceeds the sum of the current datum plus a box size, a 'X' is written in a column and the datum price shifted to the datum plus box size. When the market reverses by more than some multiple of the box size, a column of Os is formed, and continues in a similar manner until the market reverses by more that the prescribed multiple of box sizes. The chart can be based on tick by tick results, or on the OHLC data. In conventional point and figure charting, the use of OHLC data can introduce ambiguity into the charting process, as a large price differential between the high and the low in a single day can occur, potentially resulting in a reversal in both directions without it being clear whether the high or low occurred first.

One attractive feature of point and figure charting is the fact that conventionally accepted chart formations, such as double tops and triangles, can be clearly identified. Buy signals can be generated when prices surpass a previous bottom pivot point by one or more boxes, and the reverse for sell signals. This eliminates much of the subjectivity of other analysis techniques. However, point and figure charting is highly dependent on the box size chosen, and relevant formations can be missed if the box size is not appropriate. Some points to note are: (1) point and figure charting conventionally works forwards from a datum rather than backwards from the end of the series (this means that the sequence of X's and O's required to generate a trading pattern depends on the date and price used to start the sequence, which usually results in delayed pattern completion dates, depending on how fortunate was the choice of origin); (2) the intention is to produce a chart using a fixed box size, from which a formation will hopefully be recognised visually; (3) the box size acts as a filter, in that small fluctuations in value do not trigger the creation of either a new 'X' or 'O', but large fluctuations do; and (4) point and figure charts are independent of time, but to create a zig-zag line, time is required. Products available for automating point and figure charting suffer similar disadvantages.

It is, therefore, desirable to provide a method and system for identifying and categorizing pivot points as part of a technical analysis of a time series of data.

SUMMARY OF THE INVENTION

It is an object of the present invention to obviate or mitigate at least one disadvantage of previous systems and methods for performing technical analysis. It is a particular object of the present invention to provide a method and system for technical analysis by identifying and categorizing pivot points in time series, particularly of time series of financial data, such as stock prices.

In a first aspect, the present invention provides a method for categorizing pivot points in a time series, such as a time series of financial data or medical data, according to their spatial importance and temporal occurrence. The time series has a predetermined end point, predetermined maximum and minimum box sizes, and a predetermined box size increment. The end point is typically the most recent price-bar information for the time series. The method consists of selecting a breakout direction for the time series. Then, for each incremental box size from the maximum to the minimum, pivot points are identified. A backwards facing point and figure charting method can be used to identify the pivot points. Unlike the conventional (i.e. forwards) method, the backwards facing method is capable of producing a point and figure chart, from which the earliest possible recognition of a completed trading pattern for a given box size and pattern type, is guaranteed. For the present purposes, it is required for pivot categorization conditioned on some required purpose or perceived trend and rightmost price conditions relative to a search interval. Commencing at the end point and working backwards through the time series, any point where a reversal of more than the current box size occurs is identified as a pivot point. For each such identified point, the previous extreme, its associated lag from the end point, and the box size at which it is first identified is then recorded.

In a further aspect, the present invention provides a computer-program product having means, or modules, for implementing the above-described method. The computer-program product can be fixed in any suitable medium, and can be for stand-alone or network use.

In presently preferred embodiments of the present invention, the breakout direction can be determined by a perceived trend, or a desired purpose of the analysis. Typically, the time series will be normalized prior to applying the method, and, optionally, a mirror image technique can be applied to the time series.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for identifying and categorizing pivot points in the technical analysis of a time series. The time series can include time series of financial data, such as stock prices, medical data, such as electrocardiogram results, or any other data that can be presented as a time series, and in which it is desirable to identify turning points, trends, formations or other information. The method uses a modified point and figure technique to determine the pivot, or turning points, and categorizes them according to the box size at which they appear, while associating time, or lag, information with each identified point. The basic premise is to apply the point and figure charting backwards (i.e. start from the end of a time series and work backwards) using progressively decreasing box sizes, and note the box size at which a turning point first appears on a point and figure chart. The box size provides a measure of a turning point's spatial importance, and so spatial categorization is achieved. Unlike conventional point and figure methods, exact time series values, and lags from the end, are recorded for extreme values associated with each column.

Prior to the actual point and figure charting, the method of the present invention begins with a spatial categorization of a candidate time series. First, the time series is defined, usually by taking some point of interest from a larger series (henceforth called the "end point") and a suitable number of prior values to define a search period. The lag of each point with respect to the end point is determined, i.e. the end point has lag=0, the first prior point has lag=1, the second prior point has lag=2, etc.

The maximum and minimum spatial values, MaxY & MinY, of the time series are then determined. The use to which any recognised formation is to be put will normally involve some minimum spatial value. In the example of a price-time series, this will often be a minimum price move that makes a trade worth taking. Some minimal spatial value is, therefore, defined, which will normally be dependent on the intended use of the result. To determine MaxY, the maximum and minimum prices within a search period are found. MaxY is half the difference between these maximum and minimum prices.

Intrinsic noise, INoise, in the time series is then estimated. One way of determining the intrinsic noise is to construct a centred moving average and then find the standard deviation of fluctuations around that average, through the time series. A minimum increment, MinInc, of box size is defined. This can be a multiple or fraction of the minimum spatial value defined above, and is generally dependent on the resolution desired for turning point categorization. Limits for box sizes can then be determined. Point and figure charts have to be created for discrete box sizes, so it follows that suitable limits can be expressed in terms of the number of discrete increments that make up a box. In terms of pseudo code, suitable limits are: trunc(0.5*(MaxY−MinY)/MinInc+1) and trunc(INoise/MinInc+1), for upper and lower limits respectively.

Using the determined upper and lower limits, point and figure charts can now be created, starting with high box sizes and working down to low box sizes in incremental steps. These point and figure charts may be forwards or backwards facing, but in a presently preferred embodiment of the present invention, particularly for price formation recognition methods, backwards-facing charts are generally preferred.

For each box size, the data necessary to create a point and figure chart is determined. Moving backwards through the time series, any new extreme price movements in the same market direction, are noted, together with their associated lag from the end. If the market reverses direction by more than a box size, a new column is created. The extreme value prior to the reversal, and its associated lag, define a turning point. Any turning point that has not been previously found is tagged with the box size, or, in a presently preferred embodiment, the number of increments of the box size, or box size index, for which it is first found and its lag from the end of the series. This results in a set of turning, or pivot, points categorized according to their spatial importance, and their relative time occurrence.

Figure 1:
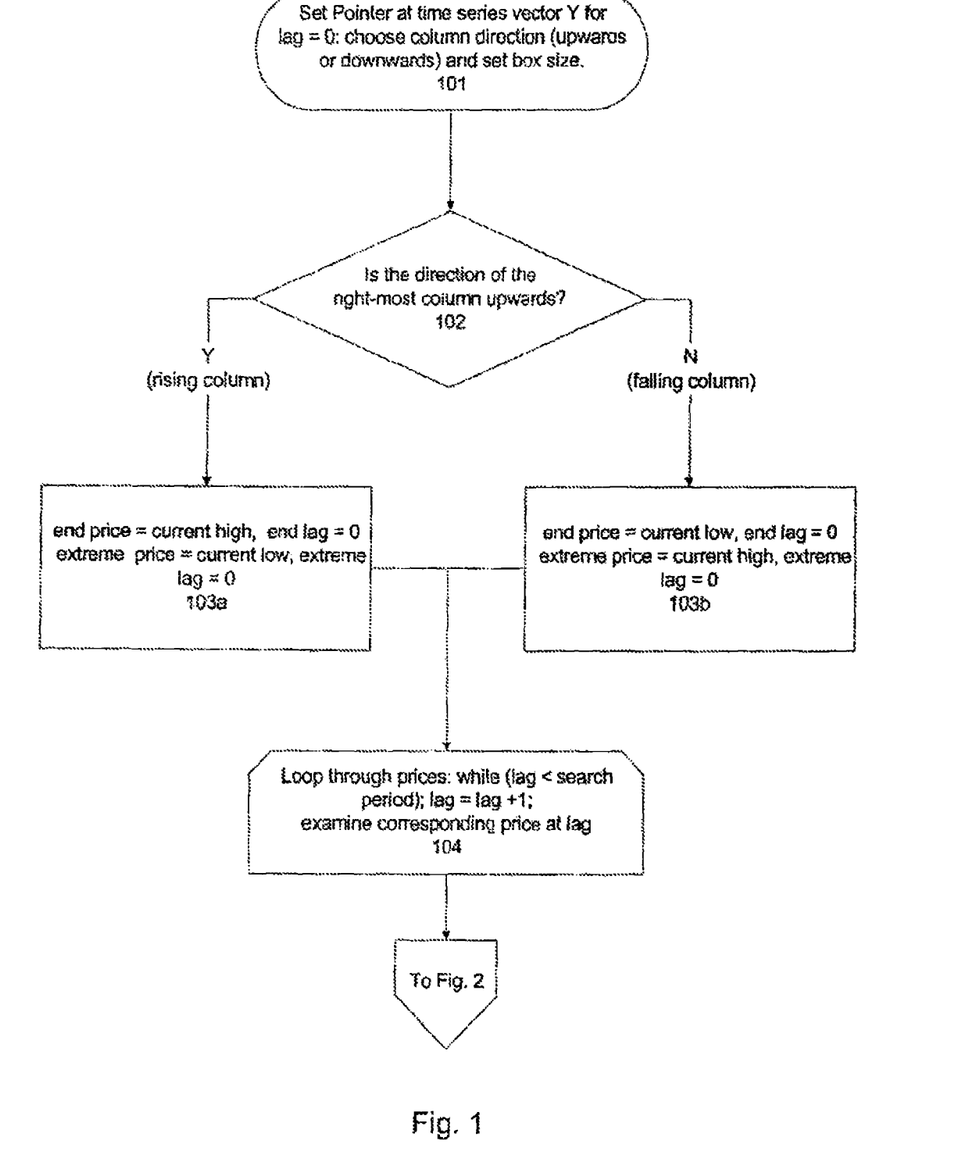
FIG. 1 is a flowchart of a method for pivot point identification according to an embodiment of the present invention.
Figure 2:
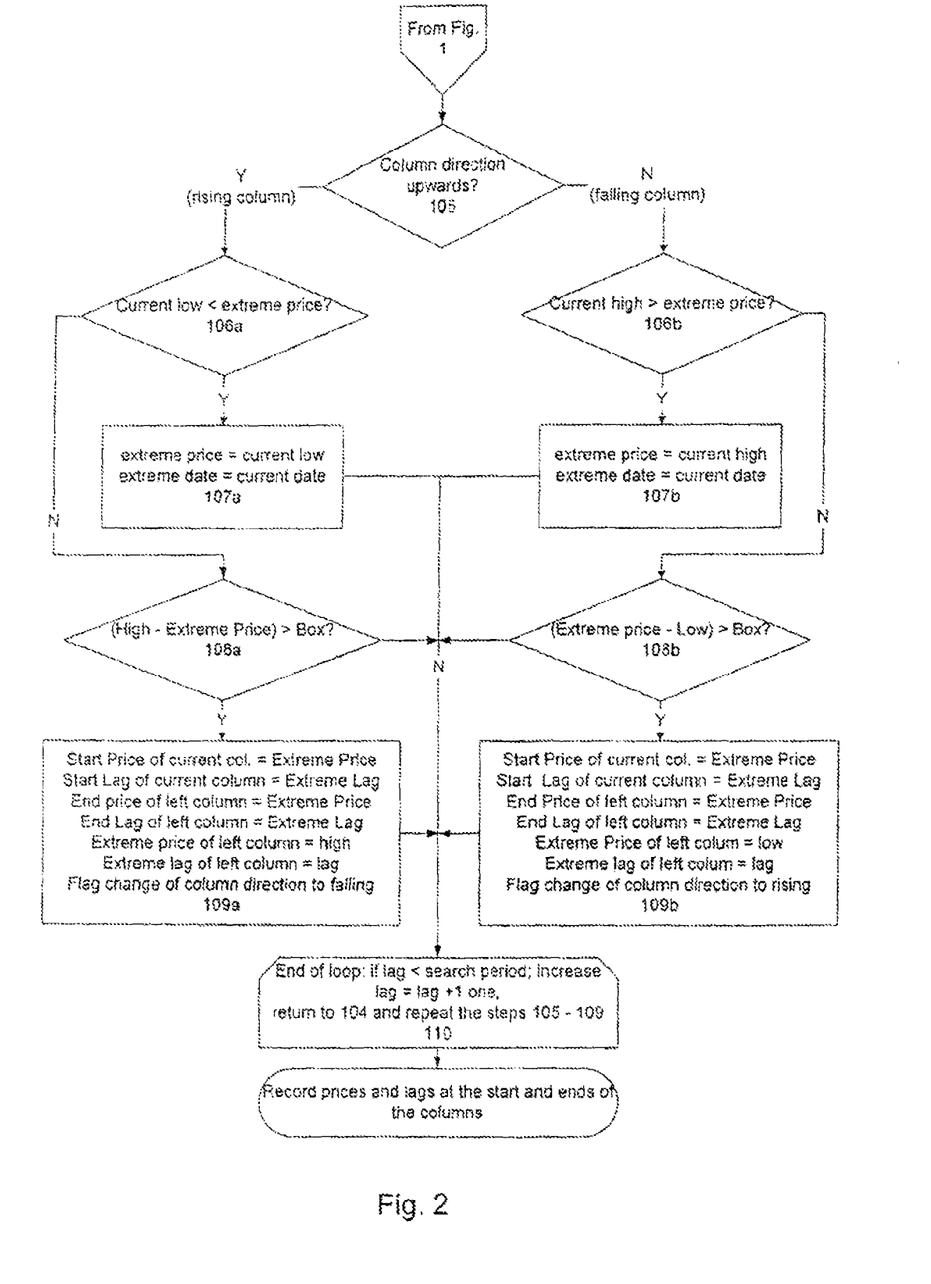
FIG. 2 is a continuation of the flowchart of FIG. 1.

Referring to FIGS. 1 and 2, a method for backwards facing point and figure charting, according to an embodiment of the present invention, is shown. The flowchart assumes that the lags, minimum box size increment, intrinsic noise, and maximum and minimum spatial values have been determined as described above. While the following description assumes that the time series data includes both high and low values for each time period, continuous data can also be used, in which case the high and low for each time period are considered to be equal. First, at step 101, a pointer to the time series is set to the end point (i.e the record at lag=0), the box size is set, and the present market direction of the final column, or breakout direction, of the point and figure chart is set. The breakout direction can be either upwards or downwards. In a bull trend, if a reversal formation were sought, the direction of the final column would be set to downwards (i.e. a falling column). In the same bull trend, if a continuation formation were sought, the direction of the final column would be set to upwards (i.e.

a rising column). The opposite applies to bear trends. As will be appreciated by those of skill in the art, this means that for any given price record and box size, two different point and figure charts can be generated by the method of the present invention.

As shown at step 102, the method proceeds down the left side of the flowchart if the breakout direction is set as upwards or rising, and down the right side of the flowchart if the breakout direction is set as downwards or falling. Assuming that the breakout direction is upwards, in step 103a (and vice versa for step 103b) the end price is set to the current high at lag=0, and the extreme price is set to the current low at lag=0. Initially, both the end lag and extreme lag are set to "0". Generally, the end price is derived from the most recent price bar associated with the right-most column of the point and figure chart under construction. Similarly the end lag is the most recent lag associated with the right-most column. Extreme price and lag refer to conditions assumed to occur earlier in the development of the column and are recorded to provide a best estimate from which earlier prices can be compared for new extremes or reversals.

The method then enters a loop at step 104 until the time series has been examined for a desired search period where each record in the time series is examined in succession. Again, assuming that the column under consideration has an upwards direction at step 105, the current low of the next record is compared to the extreme price at step 106a. If the current low is less than the extreme price, the extreme price is set to the current low, and the extreme lag is set to the current lag at step 107a, and method moves to the next record in the time series and returns to step 105. If not, the difference between the current high and the extreme price is compared to the selected box size at step 108a. If the difference is less than the box size, no reversal has occurred, and the method again moves to the next record and returns to step 105. If the difference is greater than the box size, a reversal has occurred at this box size and the data necessary to identify the pivot point is recorded at step 109a. The identified pivot point has a price equal to the extreme price and a lag equal to the extreme lag. In general, extremes refer to conditions in the current column and become start prices for a current column, and end prices for the column immediately to its left when a reversal is detected. The column direction is changed as a result of the reversal, and the method moves to the previous record (i.e the next lag) in the time series and returns to step 105 from which it will proceed to step 106b. Steps 106b to 109b are as illustrated, and are the converse of those described above.

The above described method can then be repeated at each desired box size, preferably from largest to smallest, and the first appearance of a pivot point, and the box size at which it appears can be noted. This results in the categorization of pivot points according to their relative spatial importance, which information can be used most advantageously in subsequent formation recognition, as a filter in the point and figure charting, or as an input to a neural net.

Referring to FIGS. 1 and 2 and Appendices A-C, the following is an example of the method of the present invention. Appendix A is a time series of stock price information over a period of 101 days on which it is desired to categorize the pivot points. This particular time series is a being examined for a possible bottom formation, and so it is assumed that the breakout direction is upwards. To ease the calculation, data is normalized to achieve a mid-range value of 100 on the final bar. For downwards reversing or "top" formations a mirror image of the normalised data can be created and pivot point categorization carried out using the assumption that the right-most column is falling; i.e. breaking out to the down side. This enables a bottom formation recognition algorithm to be applied for the recognition of the equivalent top formation; e.g. a head and shoulders bottom formation recognition algorithm could be used to recognise a head and shoulders top when applied to mirror-imaged pivots.

The lag of each point from the end point (lag=0), is shown in the first column. The Y vector in this case is the price information associated with each date, particularly the HIGH and LOW values. The minimum box size increment for analyzing the data is set at 0.0750, as described above, and a box size of 0.9 is used in the example.

Looking at Appendix A, the end price on 24/1/50 is a high, 100.2766 and extreme price for the same day is a low, 99.7234. On 23/1/50, the low is 99.2162 and so the extreme price (step 106a) is re-set to 99.2162 and the extreme lag to 1. On 20/1/50, the low is 98.9396 so again from step 106a, the extreme price is set to 98.9396 and the extreme lag to 2. On 19/1/50, the low is 98.6630, which again is lower than the previous extreme price, requiring the extreme price to be reset to 98.6630 and the lag to 3. On 18/1/50, the low is 98.4786, which for the same reason as before, requires the extreme price to be reset to 98.4786 and the lag to 4. On 17/1/50, the low is 99.1240, which requires no re-setting of extreme values. The method then looks for a possible reversal at step 108a. The high minus the extreme price is (99.3545−98.4786)=0.8759, which is less than the box size (0.9) and so there is no reversal. On 16/1/50, the low (98.7552) is again above the extreme (98.4786) and so the method proceeds to check for a reversal. In this case, the high minus the extreme is (99.8617−98.4786)=1.3831, which is greater than the box size (0.9), and so a reversal is flagged. The starting price of the right-most column is now set to 98.4786 and starting lag to 4, which were unchanged conditions initially established on 18/1/50. The column immediately to the left of the right-most column now has its end conditions set identically; i.e. price of 98.4786 and lag of 4. The extreme price of the left column is now set to the high (99.8617) and the lag to 6. The method now returns to the top of the loop and proceeds down the 'b' branch of the flowchart since there has been a reversal from a rising column to a falling column.

On 13/1/50, the high (99.3545) is less than the extreme (99.8617) and so a reversal is checked for. In this case, the extreme minus the low (99.8617−98.4325)=1.4292 is greater than the box size (0.9) and so a reversal has occurred. The start price of the current column is set to the extreme (99.8617) and the start lag to 6. The end conditions for the column to the left are set identically, and extreme conditions for that column set to a price of 98.4325 and lag of 7. A reversal to an upwards column is flagged and the method returns to the top of the loop and proceeds down the 'a' branch.

Figure 3:
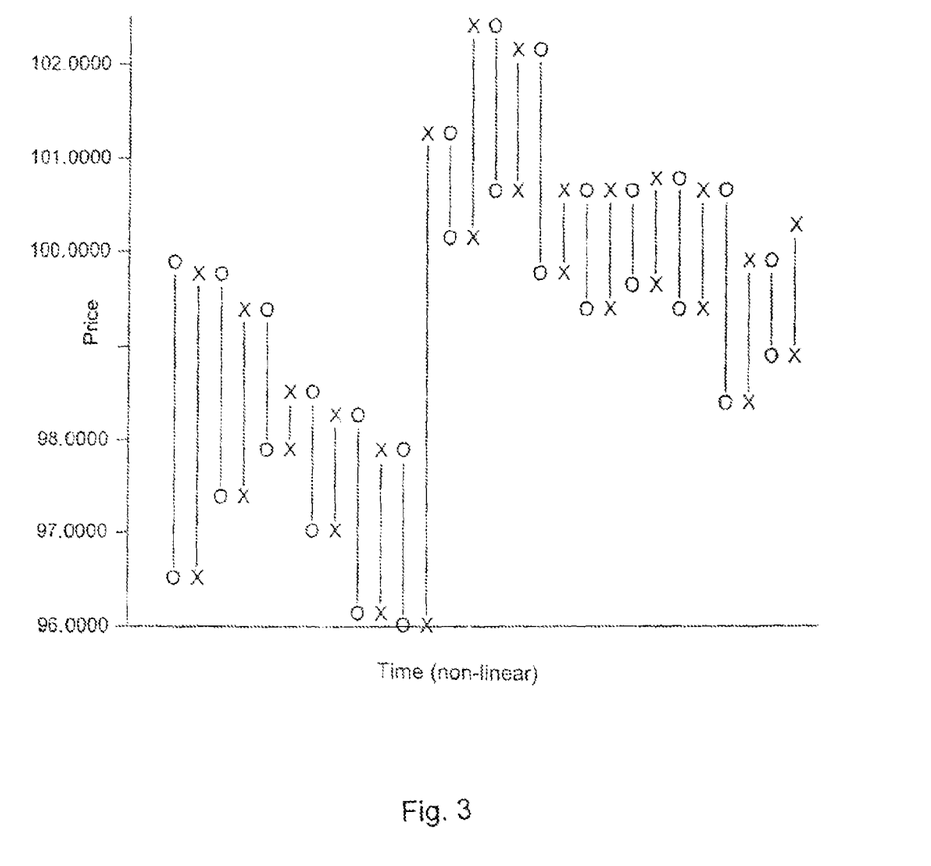
FIG. 3 is an example of a point and figure chart constructed according to an embodiment of the present invention.

The above process continues until all lags of interest have been examined and the properties (price and lags at beginnings and endings) of the columns are the output. The figures in this example are the first four noted in Appendix B. Appendix B shows the results of the pivot point identification. The rows in Appendix B are analogous to columns in point and figure charting. One minor difference is that exact highs and lows are recorded. A point and figure chart, such as that shown in FIG. 3, can easily be constructed from the data in Appendix B. The charting begins at the rightmost column with the most recent data at lag=0.

So far, the method of the present invention has assumed the existence of two data values, a high and a low, at each time step. However, the method works equally well with one data value at each time step (i.e. when the high and low are identical). One example is continuous (tick-by-tick) price data, which can be analyzed by the algorithms described herein, and its time series categorized for trading pattern recognition, or any similar purpose.

The step of pivot categorization works by using progressively decreasing box sizes and recording the number of the filter increment at which a pivot first appears for a particular point in the time series. Appendix C shows the results of doing this for the given example, for box size indexes ranging from 49 to 12. For ease of subsequent manipulation and formation recognition, a convention is established where pivot lows are registered with a negative number of increments and pivot highs with a positive. Inspection of Appendix C shows that pivots alternate between high and low. It is possible to get a number of successive highs or lows. Where this is the case, the high or low corresponding to the largest box size is used, and others in the successive sequence can be discarded.

Embodiments of the present invention can be implemented as a computer-readable program product, or part of a computer-readable program product, for use as a stand-alone product or accessible on a network, such as the Internet. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art will appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer-readable program product may be distributed as a removable medium with accompanying printed or electronic documentation (e.g., shrink-wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer-readable program product) and hardware. Still other embodiments of the invention may be implemented as entirely hardware, or entirely software (e.g., a computer-readable program product).

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

As will be appreciated by those of skill in the art, the pivot point categorization of the present invention creates a rich data set for subsequent formation recognition by neural nets, by associating both spatial importance, i.e. the box size index, and time data, i.e. the lag, with each identified pivot point.

The above-described embodiments of the present invention are intended to be examples only. Alterations, modifications and variations may be effected to the particular embodiments by those of skill in the art without departing from the scope of the invention, which is defined solely by the claims appended hereto.

APPENDIX A

Time Series

| LAG | D | M | Y | OPEN | HIGH | LOW | CLOSE |
|---|---|---|---|---|---|---|---|
| 100 | 6 | 9 | 49 | 93.5915 | 94.5597 | 93.4532 | 94.5136 |
| 99 | 7 | 9 | 49 | 94.6058 | 94.7441 | 94.3292 | 94.5597 |
| 98 | 8 | 9 | 49 | 96.1272 | 96.6344 | 95.9428 | 96.5883 |
| 97 | 9 | 9 | 49 | 96.9110 | 97.0493 | 96.4500 | 96.5422 |
| 96 | 12 | 9 | 49 | 96.6344 | 96.9571 | 96.4500 | 96.8649 |
| 95 | 13 | 9 | 49 | 97.0032 | 97.7409 | 96.9110 | 97.4182 |
| 94 | 14 | 9 | 49 | 97.5104 | 97.5565 | 97.0954 | 97.3721 |
| 93 | 15 | 9 | 49 | 97.2799 | 98.3864 | 97.0493 | 98.2941 |
| 92 | 16 | 9 | 49 | 98.3402 | 98.8935 | 98.2019 | 98.4325 |
| 91 | 19 | 9 | 49 | 98.2941 | 98.4786 | 97.5104 | 97.5104 |
| 90 | 20 | 9 | 49 | 97.3260 | 97.4182 | 96.5883 | 97.3721 |
| 89 | 21 | 9 | 49 | 97.3260 | 97.9253 | 97.2799 | 97.8792 |
| 88 | 22 | 9 | 49 | 98.0636 | 98.2480 | 97.8792 | 98.2480 |
| 87 | 23 | 9 | 49 | 98.0175 | 98.2019 | 97.5565 | 97.8792 |
| 86 | 26 | 9 | 49 | 98.2019 | 98.7091 | 97.9253 | 98.7091 |
| 85 | 27 | 9 | 49 | 98.6630 | 99.6773 | 98.4786 | 99.6312 |
| 84 | 28 | 9 | 49 | 99.5851 | 99.7234 | 98.9857 | 99.1701 |
| 83 | 29 | 9 | 49 | 99.1240 | 99.1701 | 98.5247 | 98.6630 |
| 82 | 30 | 9 | 49 | 98.7552 | 98.8935 | 98.3402 | 98.8474 |
| 81 | 3 | 10 | 49 | 98.3864 | 98.8935 | 98.2480 | 98.7552 |
| 80 | 4 | 10 | 49 | 98.8474 | 98.8474 | 98.0175 | 98.2019 |
| 79 | 5 | 10 | 49 | 97.8792 | 98.4325 | 97.8331 | 97.9714 |
| 78 | 6 | 10 | 49 | 98.2941 | 98.7091 | 98.2019 | 98.4786 |
| 77 | 7 | 10 | 49 | 98.4786 | 98.6630 | 97.8792 | 97.9253 |
| 76 | 10 | 10 | 49 | 97.4643 | 97.5565 | 97.3260 | 97.4643 |
| 75 | 11 | 10 | 49 | 97.7409 | 97.9253 | 97.4643 | 97.7870 |
| 74 | 12 | 10 | 49 | 97.7409 | 97.9253 | 97.4643 | 97.7870 |
| 73 | 13 | 10 | 49 | 97.8331 | 97.9253 | 97.4643 | 97.5104 |
| 72 | 14 | 10 | 49 | 97.7409 | 97.8792 | 97.3721 | 97.4643 |
| 71 | 17 | 10 | 49 | 97.8792 | 98.0636 | 97.7409 | 97.7870 |
| 70 | 18 | 10 | 49 | 97.4643 | 98.4786 | 97.4643 | 98.2019 |
| 69 | 19 | 10 | 49 | 98.3864 | 98.7552 | 98.3402 | 98.3864 |
| 68 | 20 | 10 | 49 | 98.4786 | 98.8474 | 98.3864 | 98.6630 |
| 67 | 21 | 10 | 49 | 98.6630 | 98.8013 | 98.3864 | 98.4786 |
| 66 | 24 | 10 | 49 | 98.5247 | 99.2623 | 98.5247 | 99.2162 |
| 65 | 25 | 10 | 49 | 99.1701 | 99.4006 | 98.9396 | 99.1240 |
| 64 | 26 | 10 | 49 | 99.1240 | 99.3084 | 98.8474 | 98.8474 |
| 63 | 27 | 10 | 49 | 98.7552 | 98.8935 | 98.0175 | 98.2941 |
| 62 | 28 | 10 | 49 | 98.3402 | 98.4325 | 97.8331 | 98.3402 |
| 61 | 31 | 10 | 49 | 98.7552 | 98.8474 | 97.7870 | 97.8331 |
| 60 | 1 | 11 | 49 | 97.9253 | 98.0175 | 97.0954 | 98.0175 |
| 59 | 2 | 11 | 49 | 97.9714 | 98.2019 | 97.7409 | 97.8792 |
| 58 | 3 | 11 | 49 | 97.9253 | 98.2019 | 97.5104 | 97.7409 |
| 57 | 4 | 11 | 49 | 97.7870 | 98.2941 | 97.7409 | 98.2019 |
| 56 | 7 | 11 | 49 | 97.7870 | 97.8331 | 96.6805 | 96.8649 |
| 55 | 8 | 11 | 49 | 96.5883 | 97.4643 | 96.1734 | 97.4182 |
| 54 | 9 | 11 | 49 | 97.2799 | 97.6026 | 96.9110 | 97.5565 |
| 53 | 10 | 11 | 49 | 97.5104 | 97.8331 | 97.1415 | 97.4182 |
| 52 | 11 | 11 | 49 | 97.5104 | 97.8331 | 97.1415 | 97.4182 |
| 51 | 14 | 11 | 49 | 97.3260 | 97.5565 | 97.0493 | 97.3260 |
| 50 | 15 | 11 | 49 | 97.0032 | 97.0954 | 96.4039 | 96.4961 |
| 49 | 16 | 11 | 49 | 96.5883 | 96.5883 | 96.0350 | 96.4961 |
| 48 | 17 | 11 | 49 | 96.6344 | 97.0032 | 96.4961 | 96.6805 |
| 47 | 18 | 11 | 49 | 96.6344 | 97.4643 | 96.6344 | 97.4182 |
| 46 | 21 | 11 | 49 | 97.5565 | 98.4786 | 97.5565 | 98.4325 |
| 45 | 22 | 11 | 49 | 98.2941 | 99.1701 | 98.2019 | 99.1240 |
| 44 | 23 | 11 | 49 | 99.1240 | 99.4467 | 98.6630 | 98.6630 |
| 43 | 24 | 11 | 49 | 99.1240 | 99.4467 | 98.6630 | 98.6630 |
| 42 | 25 | 11 | 49 | 98.8474 | 99.6312 | 98.8474 | 99.5851 |
| 41 | 28 | 11 | 49 | 99.8156 | 100.1383 | 99.4467 | 100.0461 |
| 40 | 29 | 11 | 49 | 100.1383 | 100.9682 | 99.8617 | 100.9682 |
| 39 | 30 | 11 | 49 | 100.9682 | 101.1526 | 100.5533 | 100.6455 |
| 38 | 1 | 12 | 49 | 100.7838 | 101.2448 | 100.5994 | 100.7838 |
| 37 | 2 | 12 | 49 | 100.9682 | 101.0604 | 100.1383 | 100.2305 |
| 36 | 5 | 12 | 49 | 101.9825 | 102.4435 | 101.5675 | 102.3974 |
| 35 | 6 | 12 | 49 | 102.3974 | 102.4435 | 101.4292 | 101.6136 |
| 34 | 7 | 12 | 49 | 101.4292 | 101.6136 | 101.0604 | 101.2909 |
| 33 | 8 | 12 | 49 | 101.1526 | 101.2448 | 100.8299 | 100.9682 |
| 32 | 9 | 12 | 49 | 100.6916 | 101.2909 | 100.6916 | 101.2909 |
| 31 | 12 | 12 | 49 | 101.6136 | 101.7520 | 101.1526 | 101.5214 |
| 30 | 13 | 12 | 49 | 101.6598 | 102.1208 | 101.6136 | 102.0747 |

APPENDIX A-continued

Time Series

| LAG | D | M | Y | OPEN | HIGH | LOW | CLOSE |
|---|---|---|---|---|---|---|---|
| 29 | 14 | 12 | 49 | 102.1208 | 102.1669 | 101.1987 | 101.7059 |
| 28 | 15 | 12 | 49 | 101.4292 | 101.6598 | 101.2448 | 101.4753 |
| 27 | 16 | 12 | 49 | 101.5214 | 101.9825 | 101.4753 | 101.8903 |
| 26 | 19 | 12 | 49 | 101.8903 | 101.9825 | 101.2909 | 101.4292 |
| 25 | 20 | 12 | 49 | 101.1065 | 101.5675 | 101.0604 | 101.2448 |
| 24 | 21 | 12 | 49 | 101.2448 | 101.5214 | 100.2305 | 100.2766 |
| 23 | 22 | 12 | 49 | 100.0461 | 100.5994 | 99.7695 | 100.5071 |
| 22 | 23 | 12 | 49 | 100.5533 | 100.6916 | 100.1844 | 100.6455 |
| 21 | 26 | 12 | 49 | 100.5533 | 100.6916 | 100.1844 | 100.6455 |
| 20 | 27 | 12 | 19 | 100.5994 | 100.5994 | 99.9078 | 100.0461 |
| 19 | 28 | 12 | 49 | 99.8156 | 100.0922 | 99.4006 | 100.0461 |
| 18 | 29 | 12 | 49 | 100.0922 | 100.3227 | 99.8617 | 100.2766 |
| 17 | 30 | 12 | 49 | 100.3227 | 100.5994 | 100.1844 | 100.5071 |
| 16 | 2 | 1 | 50 | 100.3227 | 100.5994 | 100.1844 | 100.5071 |
| 15 | 3 | 1 | 50 | 100.3227 | 100.3227 | 99.7234 | 99.7234 |
| 14 | 4 | 1 | 50 | 99.6773 | 100.2305 | 99.6773 | 100.1844 |
| 13 | 5 | 1 | 50 | 100.3688 | 100.7838 | 100.1383 | 100.5071 |
| 12 | 6 | 1 | 50 | 100.3688 | 100.7838 | 100.2305 | 100.6916 |
| 11 | 9 | 1 | 50 | 100.6455 | 100.6455 | 99.4467 | 99.4467 |
| 10 | 10 | 1 | 50 | 99.4006 | 100.0461 | 99.3545 | 99.9078 |
| 9 | 11 | 1 | 50 | 100.1844 | 100.5994 | 99.8617 | 100.5071 |
| 8 | 12 | 1 | 50 | 100.1383 | 100.1383 | 99.1701 | 99.1701 |
| 7 | 13 | 1 | 50 | 99.1240 | 99.3545 | 98.4325 | 99.2623 |
| 6 | 16 | 1 | 50 | 99.4467 | 99.8617 | 98.7552 | 98.9396 |
| 5 | 17 | 1 | 50 | 99.2162 | 99.3545 | 99.1240 | 99.1701 |
| 4 | 18 | 1 | 50 | 99.2162 | 99.3084 | 98.4786 | 98.7091 |
| 3 | 19 | 1 | 50 | 98.9396 | 99.2623 | 98.6630 | 99.2623 |
| 2 | 20 | 1 | 50 | 99.3084 | 99.3084 | 98.9396 | 99.2162 |
| 1 | 23 | 1 | 50 | 99.2623 | 99.6773 | 99.2162 | 99.5851 |
| 0 | 24 | 1 | 50 | 99.8156 | 100.2766 | 99.7234 | 100.1844 |

APPENDIX B

Turning Points at Box Size Index = 12

| End Lag | End Price | Start Lag | Start Price |
|---|---|---|---|
| 0 | 100.2766 | 4 | 98.4786 |
| 4 | 98.4786 | 6 | 99.8617 |
| 6 | 99.8617 | 7 | 98.4325 |
| 7 | 98.4325 | 9 | 100.5994 |
| 9 | 100.5994 | 10 | 99.3545 |
| 10 | 99.3545 | 12 | 100.7838 |
| 12 | 100.7838 | 14 | 99.6773 |
| 14 | 99.6773 | 16 | 100.5994 |
| 16 | 100.5994 | 19 | 99.4006 |
| 19 | 99.4006 | 21 | 100.6916 |
| 21 | 100.6916 | 23 | 99.7695 |
| 23 | 99.7695 | 29 | 102.1669 |
| 29 | 102.1669 | 32 | 100.6916 |
| 32 | 100.6916 | 35 | 102.4435 |
| 35 | 102.4435 | 37 | 100.1383 |
| 37 | 100.1383 | 38 | 101.2448 |
| 38 | 101.2448 | 49 | 96.0350 |
| 49 | 96.0350 | 52 | 97.8331 |
| 52 | 97.8331 | 55 | 96.1734 |
| 55 | 96.1734 | 57 | 98.2941 |
| 57 | 98.2941 | 60 | 97.0954 |
| 60 | 97.0954 | 61 | 98.8474 |
| 61 | 98.8474 | 62 | 97.8331 |
| 62 | 97.8331 | 65 | 99.4006 |
| 65 | 99.4006 | 76 | 97.3260 |
| 76 | 97.3260 | 84 | 99.7234 |
| 84 | 99.7234 | 90 | 96.5883 |
| 90 | 96.5883 | 92 | 98.8935 |

APPENDIX C

Pivot Categorization Table

| Lag | Box Size Index | Price |
|---|---|---|
| 0 | 12 | 100.2766 |
| 4 | -18 | 98.4786 |
| 6 | 18 | 99.8617 |
| 7 | -24 | 98.4325 |
| 9 | 16 | 100.5994 |
| 10 | -16 | 99.3545 |
| 12 | 18 | 100.7838 |
| 14 | -12 | 99.6773 |
| 16 | 12 | 100.5994 |
| 19 | -18 | 99.4006 |
| 21 | 12 | 100.6916 |
| 23 | -12 | 99.7695 |
| 29 | 19 | 102.1669 |
| 32 | -19 | 100.6916 |
| 35 | 36 | 102.4435 |
| 37 | -14 | 100.1383 |
| 38 | 14 | 101.2448 |
| 49 | -49 | 96.0350 |
| 52 | 22 | 97.8331 |
| 55 | -22 | 96.1734 |
| 57 | 15 | 98.2941 |
| 60 | -15 | 97.0954 |
| 61 | 13 | 98.8474 |
| 62 | -13 | 97.8331 |
| 65 | 27 | 99.4006 |
| 76 | -27 | 97.3260 |
| 84 | 30 | 99.7234 |
| 100 | -49 | 93.4532 |

What is claimed is:

1. A method for generating a set of categorized pivot points from a time series of financial data for pattern recognition analysis for a user, the time series having time steps identified by a lag from an initial time step, the method comprising:

determining, by a computer, a breakout direction for the initial time step in the time series comprising a series of time steps covering a time period, wherein each time step is associated with a time, and wherein the initial time step is a most recent time step in the time period of the time series and a final time step is an oldest time step in the time period of the time series;

determining a maximum box size for the time series, wherein the maximum box size lacks intrinsic noise in the time series, wherein the intrinsic noise comprises a false pivot point that fails to represent a true change in direction in the time series;

determining a minimum box size for the time series, wherein the minimum box size is based, in part, on intrinsic noise in the time series;

determining a box size increment for the time series;

after determining the breakout direction for the initial time step, the maximum box size, the minimum box size, and the box size increment, decreasing, by the computer, a box size by the box size increment from the maximum box size to the minimum box size to generate a series of decreasing box sizes, and for each box size in the series of decreasing box sizes, incrementing a time step from the initial time step to the final time step, and for each incremental time step, by the computer identifying a subsequent extreme value and subsequent end value for a subsequently considered time step based on the breakout direction and any previously identified reversals;

determining a current extreme value for each incremental time step by comparing a previous extreme value with a subsequent extreme value and: replacing the previous extreme value with the subsequent extreme value if the subsequent extreme value corresponds to the breakout direction;

maintaining the current extreme value if the subsequent extreme value does not correspond to the breakout direction;

determining whether a reversal in the time series has occurred, wherein a reversal has occurred when the subsequent extreme value deviates from the breakout direction and the magnitude of the difference between the current extreme value and the subsequent end value is greater than or equal to a current box size of the series of decreasing box sizes, and:

switching the breakout direction if a reversal in the time series is identified; and maintaining the breakout direction if a reversal in the time series is not identified;

for each identified reversal, recording, by the computer, the current extreme value associated with the reversal, the associated lag from the initial time step, and the current box size associated with the reversal;

determining that the largest box size at which the associated reversal is not associated with intrinsic noise and is identified within a desired resolution for pattern recognition analysis;

categorizing, by the computer, the pivot points by the largest box size at which the associated reversal is identified and the associated lag from the initial time step;

generating, by the computer using the pivot points by the largest box size at which the associated reversal is identified, the set of categorized pivot points for use as a filter in point and figure charting or as an input to a neural net;

determining, by the computer, a trading pattern by analyzing the set of categorized pivot points starting from the initial time step and ending with the final time step; and presenting, by the computer, the trading pattern to the user.

2. The method according to claim 1, wherein a perceived trend determines breakout direction.

3. The method according to claim 1, wherein a pattern of interest determines the breakout direction.

4. The method according to claim 1, further comprising a step of normalizing the time series.

5. The method according to claim 1, further comprising a step applying a mirror image technique to the time series.

6. The method according to claim 1, wherein the time series is a series of financial data and the financial data comprises price-bar information comprising an end point, the end point being the most recent price-bar information for the time series.

7. A computer-readable medium storing computer-executable instructions that when executed in a computer programming language cause a machine to perform the steps of:

determining a breakout direction for an initial time step in a time series of financial data comprising a series of time steps covering a time period, wherein each time step is a value associated with a time and wherein the initial time step is a most recent time step in the time period of the time series and a final time step is an oldest time step in the time period of the time series;

determining a maximum box size for the time series;

determining a minimum box size for the time series, wherein the minimum box size is based, in part, on intrinsic noise in the time series, wherein the intrinsic noise comprises a false pivot point that fails to represent a true change in direction in the time series;

determining a box size increment for the time series;

after determining the breakout direction for the initial time step, the maximum box size, the minimum box size, and the box size increment, decreasing a box size by the box size increment from the maximum box size to the minimum box size to generate a series of decreasing box sizes, and for each box size in the series of decreasing box sizes, incrementing a time step from the initial time step to the final time step, and, for each incremental time step;

identifying a subsequent extreme value and subsequent end value for a subsequently considered time step based on the breakout direction and any previously identified reversals;

determining a current extreme value for each incremental time step by comparing a previous extreme value with a subsequent extreme value and:

replacing the previous extreme value with the subsequent extreme value if the subsequent extreme value corresponds to the breakout direction;

maintaining the current extreme value if the subsequent extreme value does not correspond to the breakout direction;

determining whether a reversal in the time series has occurred, wherein a reversal has occurred when the subsequent extreme value deviates from the breakout direction and the magnitude of the difference between the current extreme value and the subsequent end value is greater than or equal to a current box size of the series of decreasing box sizes, and:

switching the breakout direction if a reversal in the time series is identified; and maintaining the breakout direction if a reversal in the time series is not identified;

for each identified reversal, recording the current extreme value, the associated lag from the initial time step, and the current box size associated with the reversal;

determining that the largest box size at which the associated reversal is not associated with intrinsic noise and is identified within a desired resolution for pattern recognition analysis;

categorizing the pivot points by the largest box size at which the associated reversal is identified and the associated lag from the initial time step;

generating, using the pivot points by the largest box size at which the associated reversal is identified, the set of categorized pivot points for use as a filter in point and figure charting or as an input to a neural net;

determining, by the computer, a trading pattern by analyzing the set of categorized pivot points starting from the initial time step and ending with the final time step; and presenting the trading pattern to the user.

8. The computer-readable medium according to claim 7, wherein a perceived trend determines the breakout direction.

9. The computer-readable medium according to claim 7, wherein a pattern of interest determines the breakout direction.

10. The computer-readable medium according to claim 7, further comprising means for normalizing the time series.

11. The computer-readable medium according to claim 7, further comprising means for applying a mirror image technique to the time series.

12. The computer-readable medium according to claim 7, wherein the time series is a series of financial data and the financial data comprises price-bar information comprising an end point, wherein the end point is the most recent price-bar information for the time series.

* * * * *